United States Patent [19]

Erickson

[11] Patent Number: 4,784,783

[45] Date of Patent: Nov. 15, 1988

[54] NON-VOLATILE HIGH-LIFT AMMONIA VAPOR ABSORBENT

[76] Inventor: Donald C. Erickson, 1704 S. Harbor La., Annapolis, Md. 21401

[21] Appl. No.: 132,938

[22] Filed: Dec. 15, 1987

[51] Int. Cl.$^4$ ............................................. C09K 5/04
[52] U.S. Cl. ...................................... 252/69; 62/112; 62/476
[58] Field of Search ................... 252/69; 62/112, 114, 62/476

[56] References Cited

U.S. PATENT DOCUMENTS

| | | | |
|---|---|---|---|
| 1,734,278 | 11/1929 | Tandberg | 252/69 |
| 2,184,993 | 12/1939 | Coons | 252/69 |
| 3,458,445 | 7/1969 | Macriss et al. | 252/69 |

FOREIGN PATENT DOCUMENTS 3131487  2/1983  Fed. Rep. of Germany ........ 252/69

*Primary Examiner*—Robert A. Wax

[57] ABSTRACT

An absorbent solution for absorbing and desorbing useful quantities of ammonia vapor is disclosed. The absorbent has much lower vapor pressure than water, and has a wider solubility field and higher crystallization limit than any previously known non-volatile absorbent for ammonia. It is useful in absorption cycle processes and apparatus requiring high lifts from temperatures well below freezing, e.g., in thermally actuated industrial refrigeration systems or cold-climate absorption heat pumps for space heating. The new absorbent is also useful with other ammonia-type vapor, e.g., monomethylamine.

16 Claims, 1 Drawing Sheet

NON-VOLATILE HIGH-LIFT AMMONIA VAPOR ABSORBENT

TECHNICAL FIELD

This invention relates to liquid absorbent compositions which absorb and desorb useful quantities of ammonia vapor at low pressure (e.g., approximately 1 ATA (atmospheres absolute)) and at ambient temperature (approximately 30° C. or higher) with acceptable margins from crystallization. As such, the absorbent compositions are useful in novel thermally-actuated ammonia vapor compressors, which in turn find application in industrial refrigeration and low temperature heat pumps using the absorption cycle principle.

BACKGROUND ART

There has long been an identified need for a liquid absorbent for ammonia vapor which overcomes the limitations of the currently used absorbent—$H_2O$—or more properly, aqua ammonia, i.e., a liquid solution of $NH_3$ and $H_2O$ including equilibrium amounts of $NH_4OH$, which is the actual composition which alternately absorbs and desorbs ammonia vapor in conventional ammonia absorption cycles.

The limitations of $H_2O$ as absorbent for ammonia vapor stem from the appreciable vapor pressure of $H_2O$. The ammonia vapor which is desorbed from aqua-ammonia always includes a small fraction of $H_2O$ vapor. The latter, if not removed by rectification, is detrimental in the subsequent evaporation step, as the $NH_3$ preferentially evaporates, and a higher-boiling $H_2O$-containing liquid accumulates. The amount of $H_2O$ in the desorbed ammonia vapor is determined by the difference in temperature between the generator, where the desorption occurs, and the condenser, which sets the desorption pressure. For temperature differences or "drops" of up to about 50° C., the $H_2O$ content is very small (on the order of 1 or 2%), and the amount of condensed $NH_3$ which must be wastefully returned to reflux the rectifier rather than sent on to the evaporator is correspondingly very small. However, for higher drops the $H_2O$ content and resulting reflux requirement rapidly increase to the point of unacceptability. This causes the cycle coefficient of performance (COP) to rapidly decline, e.g., from 0.8 at low drops to 0.3 or lower at very high drops.

The generator-condenser drop is closely related to and indeed the primary determinant of the evaporator-absorber "lift", i.e., the difference in temperature between evaporator and absorber.

Generically there are at least two absorption cycle applications which require high lifts (higher than those practical with $NH_3$—$H_2O$ AWP (absorption working pair)) from low temperatures (well below $H_2O$ freezing temperature). They are: industrial refrigeration, wherein evaporator temperatures below about −30° C. are designed, with ambient-cooled absorbers at +30° C. or higher (lift of 60° C. or more); and space heating in cold climates, wherein ambient heat sources as low as −18° C. are to be used, and heat pump discharge temperatures above 42° C. are desired—once again a 60° C. or higher lift. Whereas the $NH_3$—$H_2O$ (aqua ammonia) absorption working pair is technically capable of satisfying the above applications, the low COP resulting from the water volatility at those conditions has precluded any known commercially viable application of ammonia absorption cycles at those high lift conditions.

What is needed, and one objective of this invention, is a non-volatile liquid absorbent for ammonia vapor, capable of high lifts without crystallization, and preferably capable of achieving a refrigeration COP of better than 0.5 and corresponding heat pumping COP of better that 1.5 at lifts in excess of 60° C. Also, the absorbent should be thermally stable up to at least 145° C., to permit the "drops" necessary for that lift. In addition, the absorbed and desorbed ammonia vapor should preferably be anhydrous to allow use of commercially available condenser and evaporator components.

Previous efforts to identify non-volatile absorbents for ammonia vapor have revealed many candidates, but none have achieved the required high lift without first encountering crystallization.

Early examples of searches for non-volatile absorbents for ammonia vapor include U.S. Pat. No. 1,734,278 and the technical article "Liquid Ammonia as a Solvent. I. The Solubility of Inorganic Salts at 25° C." by H. Hunt, appearing in the September 1932 issue (Volume 54) of the Journal of the American Chemical Society, p. 3509–3512, New York.

More recently much attention has focused on LiSCN or NaSCN as absorbent. In volume 84 No. 7 p. 1075 of the above journal (April 1962), G. C. Blytas and F. Daniels describe NaSCN—$NH_3$ properties. U.S. Pat. Nos. 3,458,445 and 4,691,532 describe use of that system in an absorption heat pump for residential heating and-/or cooling. The properties of the LiSCN—$NH_3$ system are described in the journal article "Thermodynamic and Physical Properties of Ammonia-Lithium THiocyanate System" by R. A. Macriss et al., appearing in the April 1972 issue (Vol. 17 No. 4) of the Journal of Chemical and Engineering Data, Washington, D.C.

Unfortunately neither of the above AWP's satisfies the need identified above. The system incorporating LiSCN is too thermally unstable, actually undergoing some visible decomposition at room temperature. The NaSCN-containing system is stable to above 145° C., but does not provide an adequate width of solubility field— at an ammonia vapor pressure of 1 ATA, the solution crystallization temperature is approximately 36° C. Since atmospheric pressure boiling temperature of $NH_3$ is −33° C., the "lift" at the point of crystallization is only 69° C., which does not provide an adequate margin against crystallization. For reliable operation, and allowance for upsets, a 15° C. margin to crystallization is typically required, and hence what is needed is a non-volatile liquid absorbent for ammonia which crystallizes at or above 42° C. at a $pNH_3$ of 1 ATA.

The KSCN-$NH_3$ AWP has a lesser solubility field (achievable lift) than NaSCN-$NH_3$. However, it also has a less negative deviation from Raoultian behavior. Accordingly it has been disclosed that a mixture of KCNS and NaCNS in molar ratio between 1 to 1 and 3 to 1 will provide a higher COP than is possible with only NaCNS as absorbent. It was further disclosed that other thiocyanates such as calcium or lithium could be additionally included, West German Patent No. 3131487.

The above disclosure, while improving COP, unfortunately does not solve the problem defined above. The lithium and calcium thiocyanates are not adequately thermally stable, when mixed with Na and K in the defined ratio. And the Na-K thiocyanate mixture over the defined preferred range has a markedly lesser solubility field (achievable lift) than pure NaSCN.

SUMMARY OF INVENTION

The objective of a high-lift non-volatile thermally stable liquid absorbent for ammonia vapor is achieved by providing as the absorbent solution a mixture of inorganic salts having the essential proportions of between 65 and 95 weight percent NaCNS, and between 5 and 35 weight percent of at least one of KCNS, RbCNS, and CsCNS, with the salt mixture being dissolved in ammoniacal liquid such that the ammonia constitutes between 25 and 65 weight percent of the overall absorbent composition. Within this narrowly specified range of compositions, it has surprisingly been found that, not only does the solubility field of the absorbent at an ammonia vapor pressure of 1 ATA exceed that possible with an absorbent comprised only of NaSCN salt, but the improvement possible can exceed 5° C. (e.g., increase crystallization temperature from 36° to over 41° C.), thereby making feasible high lift industrial refrigeration and space heating absorption systems.

When the salt component of the absorbent is limited to sodium and potassium salts (the most economical formulation), the preferred salt proportions are about 86 weight percent NaCNS and 14 weight percent KCNS. With either RbCNS or CsCNS in admixture with NaCNS, somewhat higher weight proportions of the minor component are preferred. Even greater increase in solubility limit is possible with ternary or quaternary salt mixtures, provided at least the critical minimum content of 65 weight percent NaCNS (an-ammoniacal basis) is maintained.

Minor amounts of other salts, not exceeding 20 weight percent, may also be present. Examples are thallium thiocyanate, zinc thiocyanate, sodium bromide, and sodium iodide. It will also generally be preferable to incorporate an appropriate minor amount of corrosion inhibitor, such as low-volatile (high molecular weight) amines, e.g., alkylamines, alcohol-amines, and others. Specific examples include tri-ethanol-amine and triethylene tetramine.

The above absorbent composition is uniquely useful in a thermally actuated solution compressor for anhydrous ammonia vapor, which is capable of suction pressures of approximately 1 ATA while using ambient cooling above about 30° C. and a heat source above about 140° C., as depicted in the FIGURE.

BRIEF DESCRIPTION OF THE DRAWING

The FIGURE illustrates the essential components of the thermally-actuated solution compressor for ammonia which uses the above-disclosed absorbent solution: a generator including means for heating; an absorber including means for cooling; and an absorbent circulation circuit including absorbent pump, absorbent heat exchanger, and absorbent pressure reducer. Also illustrated are the remaining components which may be separately supplied since the compressor delivers anhydrous ammonia vapor: the condenser, ammonia reducing valve, and evaporator.

BEST MODE FOR CARRYING OUT THE INVENTION

Figure 1:
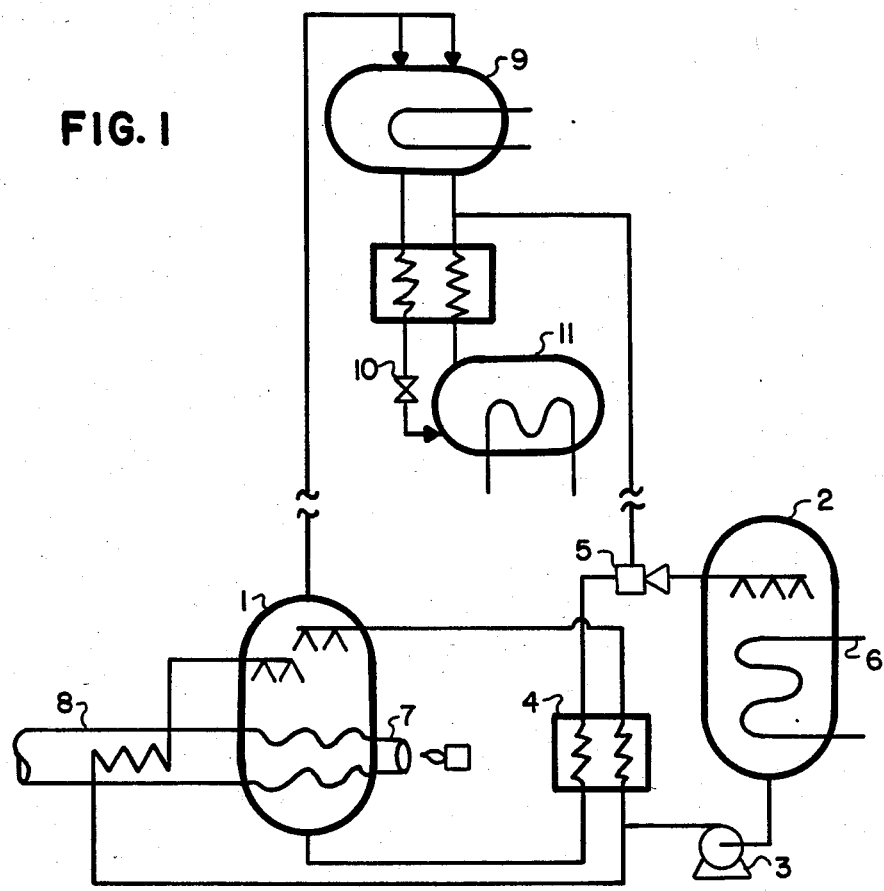

Referring to the FIGURE, the generator 1 and absorber 2 are interconnected by the absorbent solution circulation circuit comprised of solution pump 3, solution heat exchanger 4, and means for solution pressure reduction 5. Although the latter means can be merely a valve or suitable restrictor as is common in the prior art, a preferred means for pressure reduction is one which recovers energy from solution depressurization, e.g., by partially compressing the suction vapor. A low cost means of doing that is by a jet ejector, whereby the depressurization energy of the liquid is converted to high velocity, which entrains at least part of the vapor being compressed. Thus, the absorber pressure can be at a slightly higher pressure than the evaporator, and a higher lift is achieved.

The absorber is cooled by a cooling medium at 6, e.g., cooling tower water or ambient air, and the generator is heated at heater 7, e.g., by a fuel-fired burner, by steam, or other source of heat. for increased cycle efficiency, part of the dilute or weak absorbent from the absorber can be diverted to a separate heat exchanger 8, which is heated either by hot exhaust gas or by the hot compressed ammonia vapor desorbed at the generator.

As is known in the background art, the high pressure vapor would normally be routed to a condenser, and the resulting condensed ammonia would be let down in pressure by valve 10 and evaporated at low pressure in evaporator 11, for return of the low pressure vapor to absorber 6.

As is known in the background art, monomethylamine (MMA) is equivalent in many respects to ammonia as a refrigerant, with the primary differences being a lower vapor pressure (boiling temperature of −7° C. vice −33° C.) and a lower heat of evaporation. The various mixtures of alkali metal thiocyanates disclosed above which increase the solubility limit and achievable lift for ammonia also apply to monomethylamine, and to mixtures of ammonia and MMA. MMA would be preferably used whenever evaporator temperatures on the order of −7° are adequate and lower system pressure is important. Mixtures would be preferred in some instances wherein countercurrent reduction in fluid temperature ("sliding temperature") is required. These variations are encompassed within the generic invention of this disclosure, as defined by the claims.

I claim:

1. A liquid absorbent solution capable of reversibly absorbing and desorbing ammonia vapor comprising between 25 and 65 weight percent anhydrous ammonia and between 35 and 75 weight percent alkali metal thiocyanate component consisting essentially of at least 65 weight percent sodium thiocyanate (NaCNS) and at least 5 weight percent of at least one of potassium thiocyanate (KCNS), rubidium thiocyanate (RbCNS) and cesium thiocyanate (CsCNS).

2. The absorbent solution according to claim 1 wherein the thiocyanate component consists essentially of 80 to 95 weight percent sodium thiocyanate and 5 to 20 weight percent potassium thiocyanate.

3. The absorbent solution according to claim 1 wherein the thiocyanate component contains at least 5 weight percent of at least one of rubidium thiocyanate and cesium thiocyanate.

4. The absorbent solution according to claim 2 wherein the thiocyanate component consists of NaCNS and at least one of RbCNS and CsCNS.

5. The absorbent solution according to claim 1 which contains not more than 20 weight percent of salts with anions different from said thiocyanate salts.

6. The absorbent solution according to claim 1 further comprising not more than 20 weight percent of a member selected from the group consisting of a high molecular weight alkylamine, an alcohol-amine and mixtures thereof.

7. The absorbent solution according to claim 1 further comprising monomethylamine in admixture with said ammonia.

8. Apparatus for thermal compression of $NH_3$ vapor from a low pressure in the range of 0.5 to 2 ATA to a higher pressure having a saturation temperature at least about 60° C. higher than the saturation temperature of the low pressure, comprising:
   (a) a generator including means for heating;
   (b) an absorber including means for cooling;
   (c) an absorbent circulation circuit communicating with said absorber and generator, comprised of a pump, a heat exchanger and a means for pressure reduction;
   (d) a liquid absorbent solution in said circuit comprising between 25 and 65 weight percent anhydrous ammonia and between 35 and 75 weight percent alkali metal thiocyanate component consisting essentially of at least 65 weight percent NaCNS and at least 5 weight percent of at least one of KCNS, RbCNS and CsCNS; and
   (e) a means for supplying said low pressure vapor to said absorber and withdrawing said higher pressure vapor from said generator.

9. Apparatus according to claim 8 wherein said means for pressure reduction is a jet ejector and wherein at least part of said low pressure vapor is supplied to said absorber via said jet ejector.

10. An anhydrous liquid absorbent for the vapor of at least one of ammonia and monomethylamine (MMA) comprised of comprising between 25 and 65 weight percent of ammonia, MMA or a mixture thereof and between 35 and 75 weight percent of a thiocyanate salt component consisting essentially of at least 65 weight percent NaCNS and at least 5 weight percent of at least one of KCNS, RbCNS and CsCNS.

11. The absorbent according to claim 10 wherein the absorbate vapor is MMA and the thiocyanate component of the absorbent contains at least 10 weight percent KCNS.

12. The absorbent according to claim 11 wherein the thiocyanate component of the absorbent additionally contains at least one of RbCNS and CsCNS.

13. The absorbent according to claim 10 wherein the absorbate vapor is $NH_3$ and the thiocyanate component of the absobent consists essentially of NaCNS and at least one of RbCNS and CsCNS.

14. The absorbent according to claim 10 wherein the absorbate vapor comprises both $NH_3$ and MMA.

15. The absorbent according to claim 13 wherein the thiocyanate component of the absorbent consists of NaSCN and at least one of RbCNS and CsSCN.

16. The absorbent according to claim 10 additionally further comprising a minor amount of a member selected from the group consisting of a high molecular weight alkylamine, an alcohol-amine and mixtures thereof.

* * * * *